US010864638B2

(12) United States Patent
Fan et al.

(10) Patent No.: US 10,864,638 B2
(45) Date of Patent: Dec. 15, 2020

(54) REINFORCEMENT BAR JOINT RECOGNITION USING ARTIFICIAL INTELLIGENCE VISION

(71) Applicant: Logistics and Supply Chain MultiTech R&D Centre Limited, Pok Fu Lam (HK)

(72) Inventors: Ka Lun Fan, Pok Fu Lam (HK); Yan Nei Law, Pok Fu Lam (HK); King Sau Wong, Pok Fu Lam (HK); Chung Hang Leung, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 112 days.

(21) Appl. No.: 16/143,597

(22) Filed: Sep. 27, 2018

(65) Prior Publication Data

US 2020/0101616 A1 Apr. 2, 2020

(51) Int. Cl.
| | | |
|---|---|---|
| *B25J 9/16* | (2006.01) | |
| *G06K 9/46* | (2006.01) | |
| *G06K 9/20* | (2006.01) | |
| *G06K 9/32* | (2006.01) | |
| *E04G 21/12* | (2006.01) | |
| *E04C 5/16* | (2006.01) | |
| *H04L 29/08* | (2006.01) | |
| *G06N 20/00* | (2019.01) | |
| *G06K 9/40* | (2006.01) | |

(52) U.S. Cl.
CPC ............ *B25J 9/1697* (2013.01); *E04C 5/163* (2013.01); *E04C 5/166* (2013.01); *E04G 21/122* (2013.01); *G06K 9/209* (2013.01); *G06K 9/3216* (2013.01); *G06K 9/4604* (2013.01); *G06N 20/00* (2019.01); *H04L 67/125* (2013.01)

(58) Field of Classification Search
CPC ..... B25J 9/1697; G06N 20/00; G06K 9/4604; G06K 9/209; G06K 9/3216; E04G 21/122; E04C 5/163; E04C 5/166; H04L 67/125
USPC ........................................................ 382/153
See application file for complete search history.

(56) References Cited

U.S. PATENT DOCUMENTS

| | | | | |
|---|---|---|---|---|
| 5,947,166 A | * | 9/1999 | Doyle | E04G 21/123 140/119 |
| 2005/0210767 A1 | * | 9/2005 | DeFever | E04B 1/169 52/80.1 |
| 2015/0068265 A1 | * | 3/2015 | Dickson | B21D 11/12 72/203 |
| 2019/0093374 A1 | * | 3/2019 | Machida | B65B 13/285 |
| 2019/0194958 A1 | * | 6/2019 | Machida | E04G 21/123 |

(Continued)

FOREIGN PATENT DOCUMENTS

| | | | | |
|---|---|---|---|---|
| CN | 106644551 | * | 5/2017 | ............ G01M 99/00 |
| WO | WO2019048289 | * | 3/2019 | ............. B21F 23/00 |

*Primary Examiner* — Jerome Grant, II
(74) *Attorney, Agent, or Firm* — Renner, Kenner, Greive, Bobak, Taylor & Weber (57) ABSTRACT

An apparatus or system for reinforcement bar (rebar) joint recognition using artificial intelligence vision includes a rebar tying tool attached to a micro manipulator; and a macro manipulator for moving the position of the micro manipulator; wherein the macro manipulator is adapted to move the micro manipulator on a first plane; the micro manipulator is adapted to move the rebar tying tool on a second plane parallel to the first plane and at a first axis vertical to the second plane.

17 Claims, 4 Drawing Sheets

(56) References Cited

U.S. PATENT DOCUMENTS

2019/0257097 A1\* 8/2019 Kawai ........................ B21F 7/00
2020/0047930 A1\* 2/2020 Matsuno ................ B65H 75/14

\* cited by examiner

REINFORCEMENT BAR JOINT RECOGNITION USING ARTIFICIAL INTELLIGENCE VISION

TECHNICAL FIELD

The present invention relates to construction equipment, and more particularly to an apparatus or system for reinforcement bar (rebar) joint recognition using artificial intelligence vision.

BACKGROUND

Reinforcement bars tying has traditionally been labour intensive, hazardous, and a cause for delays in the building process. In particular, for large-scale projects such as forming concrete roads, slabs or floors, involve joining intersecting rebar sections covering umpteen kilometre squares of area. For example, concrete roads typically range from several metres to several tens of metres wide and more than hundreds of kilometres in length. These concrete roads, slabs, or floor surfaces require typically multiple layers of rebar in a grid pattern, with steel bars running along the length and width of the surface intersecting each other. Each intersection of rebar has to be fastened to secure their position and prevent movement during the application of concrete.

The intersections may be fastened with tie wire around the intersection. Construction workers have to tie the rebar intersections manually with a piece of tie wire. Portable electrical tying tools are commonly used increase the efficiency of this task. However, the construction workers are still required to walk along the length and width of the rebar grid, identify each intersection, bend over at each intersection, one at a time, to activate the tool gun to apply the tie or clip at each intersection. Tying rebar along a wide road surface is repetitive, time-consuming, and physically demanding work. Moreover, walking on the steel mesh at a construction site is unsafe. Having a number of construction workers working and walking on the steel mesh only increase the risk of injury significantly.

SUMMARY

The present invention provides an apparatus or system for reinforcement bar (rebar) joint recognition using artificial intelligence (AI) vision.

In one aspect of the present invention, there is provided an apparatus for reinforcement bar (rebar) joint recognition using artificial intelligence vision comprising:
a rebar tying tool attached to a micro manipulator; and
a macro manipulator for moving the position of the micro manipulator;
wherein the macro manipulator is adapted to move the micro manipulator on a first plane; the micro manipulator is adapted to move the rebar tying tool on a second plane parallel to the first plane and at a first axis vertical to the second plane.

Preferably, the macro manipulator is adapted to move along a scale larger than that of the micro manipulator.

Preferably, the macro manipulator comprises a gantry axis servo for moving the micro manipulator along a second axis on the first plane.

Preferably, the macro manipulator comprises a carrier axis servo for moving the micro manipulator along a third axis on the first plane, such that the second axis is orthogonal to the third axis.

Preferably, the macro manipulator is adapted to move in the scale of metres.

Preferably, the micro manipulator comprises a longitudinal axis servo for moving the rebar tying tool along a fourth axis on the second plane.

Preferably, the micro manipulator comprises a lateral axis servo for moving the rebar tying tool along a fifth axis on the second plane such that the second axis is orthogonal to the fourth axis.

Preferably, the micro manipulator is adapted to move in the scale of millimetres.

Preferably, the apparatus further comprises a system processor connected to one or more controllers for controlling the macro manipulator and micro manipulator.

Preferably, the system processor comprises local memory, a storage device, and a communicator.

Preferably, the system processor is adapted to connect to one or more the controllers through the communicator with wireless signals.

Preferably, one controller is adapted to control an activation servo motor for activating the rebar tying tool.

Preferably, the apparatus of further comprises one or more sensors, including an image sensor or infrared sensor for capturing images of a workpiece.

Preferably, the sensors are disposed on the rebar tying tool.

Preferably, the system processor is adapted to send the images to a server.

Preferably, the server is adapted to identify a work location on a workpiece by a pattern cognition algorithm.

Preferably, the pattern cognition algorithm comprises an artificial intelligence algorithm.

Preferably, the server is adapted to calculate a relative coordinate of the work location.

Preferably, the system processor is adapted to move the rebar tying tool to work location according to the relative coordinate.

Preferably, the rebar tying tool is adapted to tie the workpiece with wire or welding.

Advantageously, the present invention provides an improvement of robotic solution to automate the rebar tying process. For example, a new and novel apparatus or system for reinforcement bar (rebar) joint recognition using artificial intelligence vision may overcome or ameliorate at least one of the disadvantages of the prior art, or to provide a useful alternative.

Other objectives and advantages will become apparent when taken into consideration with the following specification and drawings.

BRIEF DESCRIPTION OF THE FIGURES

Features and advantages of the present invention will become apparent from the following description of embodiments thereof, by way of example only, with reference to the accompanying drawings, in which.

DESCRIPTION OF THE INVENTION

The inventors have, through their own research, trials and experiments, devised that robotic tools may be used to facilitate the routine operations of the rebar tying process.

In one example embodiment, an apparatus may be used for binding rectangularly arrayed longitudinal and transverse paving material reinforcing bars. The apparatus may consist of a self-propelled frame assembly. The self-propelled frame assembly includes means for raising up each individual one of the longitudinally arrayed reinforcing bars and for periodically tying a transverse bar thereacross with a plurality of binder ties placed at selected intersections of longitudinal and transverse bars. The self-propelled frame also includes transversely arrayed means for supporting the plurality of longitudinal reinforcing bars and inserting a transverse bar therebeneath in position to receive binding ties; thereafter, a carriage assembly bearing a pair of spaced tying assemblies and supported movably on the frame is driven intermittently across the frame to effect a tie at every other longitudinal bar. The next following transverse bar is similarly tied with the carriage moving back across the frame in the opposite direction.

In an alternative embodiment, an automatic reinforcement tying machine may be used, which comprises an automobile, a tie-wire opening, a high definition camera, a tying machine, a reel slot, a processor, mechanical arm, an alarm, the controller, driver, a counter, a built-in power supply. The automobile contains the alarm, the controller, the driver, the counter, and the built-in power supply. The tie wire opening is installed at one end of the tying machine. The high-definition camera is installed on the tie wire opening. The tying machine contains the processor, the reel slot, and connected at one end with the mechanical arm. The other end of the mechanical arm is connected to an automobile. The processor is controlling the high definition camera, the alarm, the controller, driver, a counter, the built-in power supply respectively.

In yet another example embodiment, an autonomous assembly may be used, which includes a gantry subassembly, a carrier subassembly movably mounted on the gantry subassembly, a tool actuation subassembly mounted on the carrier subassembly, and an autonomous control system. The autonomous control system includes a perception subsystem, a motion planning subsystem, and a motion control subsystem. The gantry subassembly includes a bridge member for laterally spanning a selected section of a work site and a gantry drive system for effecting travel of the gantry subassembly along a first path, generally in a longitudinally along the length of the selected portion of a work site. The carrier subassembly includes a carriage and a carriage drive system for effecting travel of the carriage along a second path, generally laterally along the bridge member. The tool actuation subassembly includes a motion actuator, an end-effector operatively connected to the motion actuator, and an actuator drive system for effecting linear travel of an end-effector along a third path, generally perpendicular to the second path.

However, these rebar tying machine or systems fail to provide an effective and efficient method to identify the rebar intersection. Hence, it still requires a skilled construction worker to control this rebar tying machine. A construction worker with such skills is a scare resource and tends to increase the costs for the construction projects. Therefore, there is a need for an improved method and system for performing repetitive physically demanding tasks, such as rebar tying.

Figure 1:
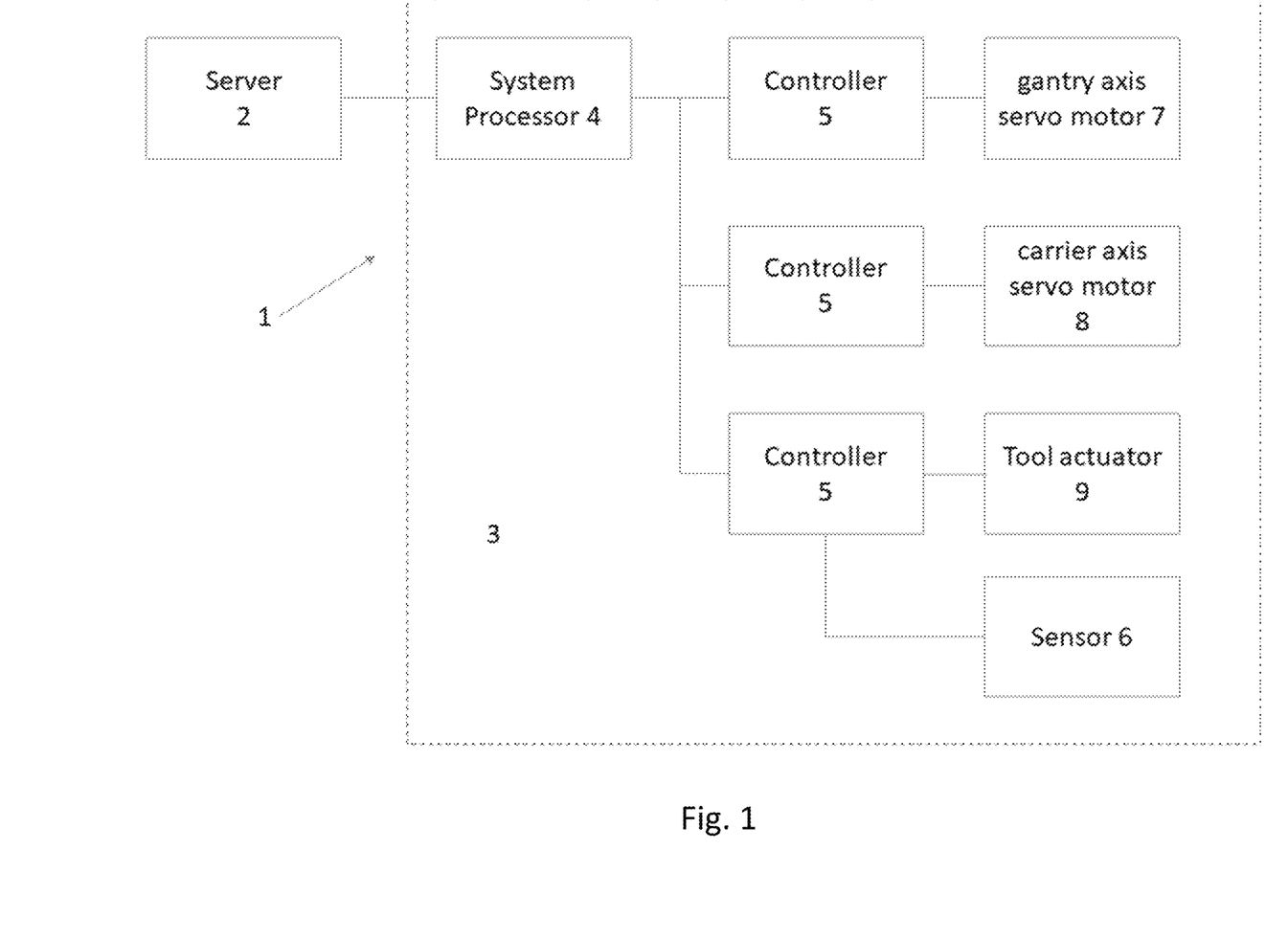
FIG. 1 shows a schematic diagram of a system for reinforcement bar (rebar) joint recognition using artificial intelligence vision of an embodiment of the present invention.
Figure 2:
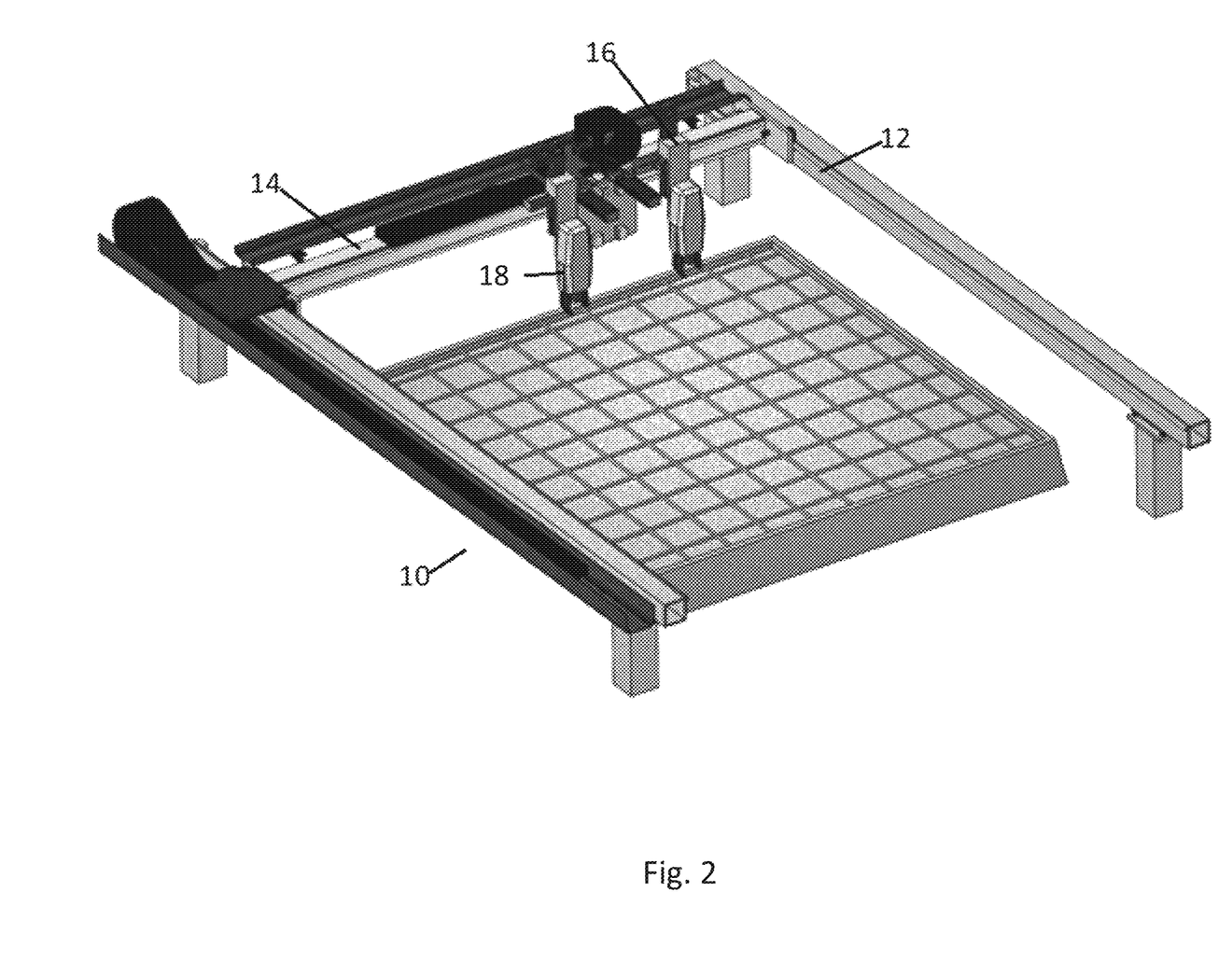
FIG. 2 shows a schematic diagram of an apparatus for reinforcement bar (rebar) joint recognition using artificial intelligence vision of an embodiment of the present invention.

FIG. 1 shows a schematic diagram of apparatus or system for reinforcement bar (rebar) joint recognition using artificial intelligence vision. The system 1 in FIG. 1 comprises server 2 associated with a rebar tying apparatus 3 as shown in FIG. 2. The rebar tying apparatus 3 comprises a system processor 4 having local memory, data storage, communication module or communicator for sending and receiving data and signals to and from the server. The system processor 4 is connected to one or more controller 5. In one embodiment, one or more controllers 5 is directly connected to the system processor 4 through system buses, while other controllers 5 are connected to the system processor 4 through wireless signals.

Figure 3:
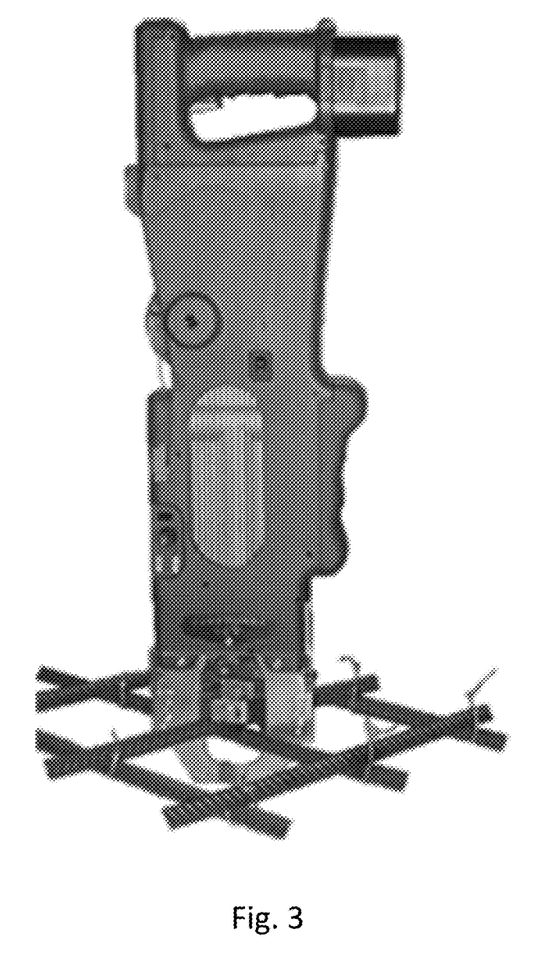
FIG. 3 shows a rebar tying tool of FIG. 2.

The controller 5 is adapted to send and receive remote data and signal from the system processor 4. The controller 5 can control one or more servo motors 7, 8 and/or actuator 9. One controller 5 is connected to a gantry axis servo motor 7 which controls a rebar tool 18 as shown in FIG. 3 to traverse a longitudinal axis (y-axis) of a workpiece or rebar mesh. Another controller 5 is connected to a carrier axis servo motor 8 which controls a rebar tool 18 to traverse a lateral axis (x-axis) of a workpiece or rebar mesh. A There is provided another controller 5 to connected to a tool actuator 9 which can effect motion of the rebar tying tool 18 in a longitudinal axis (y-axis), a lateral axis (x-axis), and a vertical axis (z-axis). The x, y, z axis are orthogonal. The tool actuator 9 is also adapted to active the rebar tying tool 18 for tying a rebar joint. In a preferred embodiment, the controller 5 of the tool actuator 9 is also adapted to control one or more sensors 6, such as an infrared sensor, image sensors) etc., that are attached to the rebar tying tool 18 or tool actuator 9.

In one embodiment, the gantry axis servo motor 7 and carrier axis servo motor 8 are macro manipulator that can move very fast in a long distance (in term of metres). As the gantry axis servo motor 7 and the carrier axis servo motor 8 have to move far apart from other parts of the system, each of them will have an individual controller 5. In one embodiment, the tool actuator 9 comprises at least four servo motors; one in longitudinal axis; one in lateral axis; one in vertical axis; one for activating rebar tying tool. There four servo motors can be controlled by a single controller 5. In one embodiment, these four servo motors are connected in a serial configuration. In one embodiment, the servo motors on the tool actuator 9 are micro manipulator that can move in a tiny distance with great precision (in term of millimetres).

When in operation, the system processor 4 moves the rebar tool around a workpiece and takes multiple images with the sensors 6. The system processor 4 then send the images to the server 2 to conduct image recognition using an artificial intelligent algorithm to identify a work location or an untied rebar joint, and calculate the relative coordinate of the work location. The server 2 then sends the relative coordinates of the untied rebar joint to the system processor 4. The system processor 4 then moves the rebar tying tool to the corresponding untied rebar joint and actuates the rebar tying tool to tie the rebar joint.

It is envisaged that the rebar tying tool 18 may be able to tie the rebar with wire or by welding.

Reference is now made to FIG. 2 and FIG. 3. The apparatus 10 in FIG. 2 comprises a gantry axis rail 12 effects motion along a longitudinal path of the work site; the carrier axis rail 14 effects motion in the lateral direction, generally transverse to the longitudinal path; and the tool actuator 16 has a rebar tying tool 18 attached thereto. The tool actuator 16 effects motion of the rebar tying tool 18 as shown in FIG. 2 in the vertical direction.

The typical size of the rail grid is around 4.9 m×3 m and the typical diameter of rebar 10-12 mm. In one embodiment of the present invention, there is provided a micro-macro manipulator with AI vision. The macro manipulator comprises large scale 2-axis gantry rails. The vision sensors or cameras are adapted to recognize the rebar joint or intersection position, e.g. depth camera 30 cm above the workpiece grid can sense bar-shape objects with a diameter of 10 mm. Then the micro-manipulator with an auto rebar tier to position joints precisely. In one embodiment, one or more piezoelectric motor or voice coil motor.

The gantry axis rail 12 allows the carrier axis rail 14 to traverse along a longitudinal axis of a workpiece or rebar mesh. In one embodiment, the gantry axis rail comprises a conventional steel level rail. In alternative embodiments, the gantry axis rail may be structured with wheels.

The carrier axis rail 14 comprises a servo motor or actuator for controlling the movement of the carrier axis rail along the gantry axis rail 12. The servo motor or actuator is typically connected to one or more wheel to facilitate the traverse movement. In one embodiment of the present invention, the servo motor or actuator of the carrier axis rail 14 is connected to a brake for securing the carrier axis rail at a precise location on the gantry axis rail 12.

The carrier axis rail 14 is adapted to allow the tool actuator 16 to move across the transverse span of the carrier axis rail 14 which is substantially perpendicular to the gantry axis rail 12. In one embodiment, the servo motor or actuator of the carrier axis rail 14 is connected to a microcontroller 5 that is communicable to a system processor 4 of the apparatus 10. In one embodiment, the system processor is adapted to communicate with the microcontroller 5 through a wireless means, such as radio, WiFi, Bluetooth, etc.

The carrier axis rail 14 is adapted to allow the tool actuator 16 to traverse across its entire length. In one embodiment, the tool actuator 16 comprises a first set of servo motor or actuator to move along the carrier axis rail 14. Alternatively, the carrier axis rail 14 comprises a servo motor or actuator to propel the tool actuator 16 across its length. In one embodiment, the servo motor or actuator of the carrier axis rail 14 is connected to a microcontroller that is communicable to a system processor of the apparatus 10. The system processor is adapted to communicate with the microcontroller 5 through a wireless means, such as radio, Wi-Fi, Bluetooth, etc.

The gantry axis rail 12 and the carrier axis rail comprises one or more macro manipulator. In one embodiment, one or more voice coil motor is used to drive the macro manipulator.

In one preferred embodiment as shown in FIG. 2, the apparatus 10 comprises one or more tool actuators 16 on the carrier axis rail 14. Each tool actuator 16 is connected to a rebar tying tool. Each tool actuator has a first set of servo motors or actuators or micro-manipulator to move the rebar tying tool 18 along a longitudinal axis, a lateral axis, and a vertical axis in a comparative smaller displacement than the macro-manipulator. Each tool actuator has a second set of servo motor or actuator to active the rebar tying tool 18, such that the rebar tying tool can bind the joint of the rebars. Each tool actuator 16 has a tool actuator microcontroller for controlling the first and second sets of servo motor or actuator, and communicating with the system processor.

In one embodiment, each tool actuator microcontroller is associated with a separate system processor or separate system core, such that each tool actuator 16 can carry out independent task simultaneously via parallel processing.

In one embodiment, one or more sensors are attached to the rebar tying tool 18. The sensors may be infrared sensors, RGB sensors, laser sensor, high definition cameras, or a combination thereof. In one application of an embodiment of the present invention, the rebar tying tool 18 has an infrared light source, an infrared sensor, and a RGB sensor to produce a three dimension depth colour image. In another embodiment, the rebar tying tool 18 has two cameras to produce a stereo image. Typically, multiple layers may make joint recognition difficult with a RGB sensor only. A combination of depth and RGB sensors can improve the reliability of the images captured in a multiple layers workpiece background.

In a preferred embodiment, the rebar joint detection and localisation are realised by a so-called eye-in-hand depth or stereo vision system where the sensors or cameras are mounted on the rebar tying tool 18. This solution is particularly suitable for fixed mounting of equipment (e.g. camera, arm) above the rebar grid is not possible. Alternatively, the sensors are attached to the tool actuator 16.

The depth or stereo vision system consists of two sensors rigidly mounted to the rebar tying tool 18. An eye-in-hand depth or stereo vision system offers many benefits as the sensors can be manoeuvred to get an unobstructed view of the rebar. Their compact size also allows for better access to a wider range of rebar tying positions. Typically, thin rebar is difficult to capture using a depth sensor, but the eye-in-hand configuration allows the camera to be moved to a closer distance from the rebar for capturing better depth images.

The depth or stereo vision system is achieved using multiple sensors or cameras. Although depth or stereo vision can be achieved using a single moving sensor or camera, or single sensor or camera at two adjacent tool actuators 16, dual sensors or cameras allow for efficient image capture of the rebar joint as the adjacent tool actuators 16 do not have to be moved multiple times. In addition, the prefix position of the dual sensors or cameras makes it easier to control the distance between two sensors or camera to produce more accurate depth stereo images.

In one embodiment, the system processor is adapted to forward the depth or stereo images to a server for joint recognition using artificial intelligence vision. The server 2 may be a single system or a cloud system located remotely from the worksite.

Figure 4:
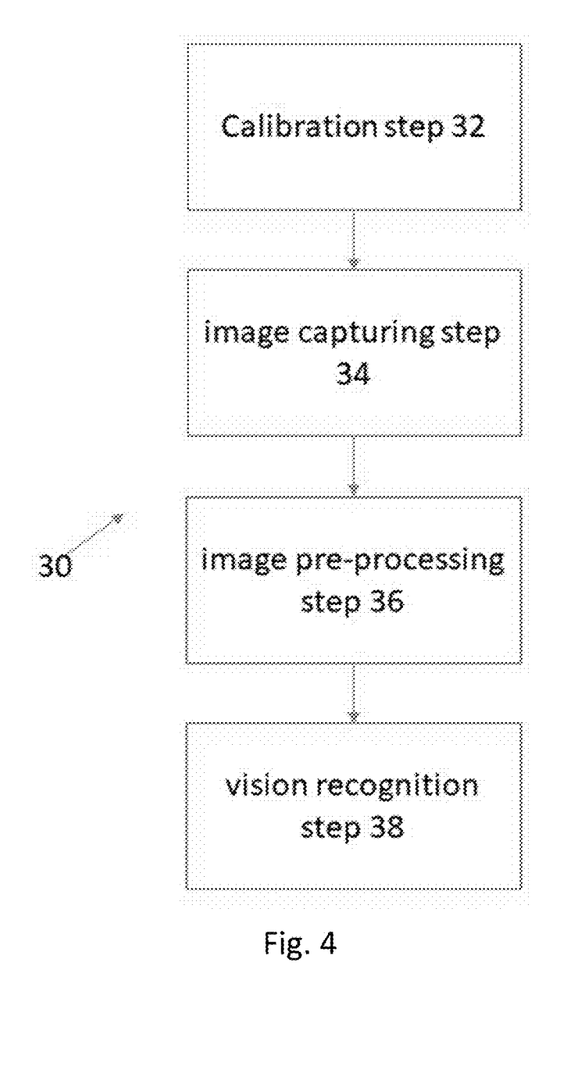
FIG. 4 shows a process for reinforcement bar (rebar) joint recognition using artificial intelligence vision of an embodiment of the present invention.

FIG. 4 provides a schematic diagram of the process 30 of the apparatus or system for reinforcement bar (rebar) joint recognition using artificial intelligence vision. In operation, the apparatus 10 has to calibrate its position and the eye-hand coordination as shown in calibration step 32. The calibration step 32 may only carry out once when the apparatus is started up.

After the calibration step 32, the apparatus 10 can move the rebar tying tool 18 around and capture a plurality of images in the image capturing step 34. The system process of the apparatus 10 may store the previous location such that the apparatus 10 may resume the joint recognition from the previous location.

In one embodiment, the apparatus 10 must be calibrated in the calibrate step 32 before carrying the rebar tying task. The calibration is required to establish the relationships between the sensors, the rebar tying tool 18, and the workpiece using the vision system. The first step is to capture a set of images of the calibration object with known dimensions to provide correspondences between pixels and real world or relative coordinates. The process of sensor calibration can involve processing multiple images at each rebar tying tool 18 and is arguably the most important step in the overall calibration of a vision system.

In one embodiment, the sensor calibration is achieved by capturing multiple images of a calibration pattern. The calibration pattern provides a set of feature points with known 3D real world or relative coordinates. By obtaining the correspondences between the feature points in the 2D image plane and the 3D real world from multiple images, the sensor parameters can be determined. Because sensor calibration for a depth or stereo system is time-consuming and highly repetitive. From this perspective, it makes sense to automate the camera calibration process.

In one embodiment, the automatic calibration algorithm is used to determine the intrinsic and extrinsic parameters of the cameras. Based on the data obtained from the initial sensor calibration, an estimation of the hand-eye and tool-world transformation is determined. Finally, the actual hand-eye and tool-world transformations as well as the calibration of the apparatus 10 are solved simultaneously using a non-linear optimisation method.

Once the depth or stereo images are captured in image capture step 34, the depth or stereo images are subject to one or more image filters for image pre-processing step 36. The image filters will clear up the noise on the images to facilitate the pattern recognition. Typically, depth or RGB camera performance may be degraded in a semi-outdoor environment. In one embodiment, the image pre-processing step 36 can reduce the noise due to the outdoor environment.

Referring to the image pre-processing step 36, outdoor image degradation due to bad weather condition is considered as a major problem in most vision based applications.

In one embodiment, the image pre-processing step 36 utilises image enhancement methods such as model based and non-model based methods. Non-model based use the information in the image for processing and model based uses extra information about the imaging equipment and environment.

In another embodiment, polarizing filters or sensors are used to reduce the glare, reduce surface reflections, and increase the clarity of structures, defects, and shapes.

After the image pre-processing step 36, the images will be subjected to the artificial intelligence vision recognition step 38 to identify the untied rebar joint. In one embodiment of the present invention, the apparatus 10 uses a neural network pattern recognition algorithm for identifying the untied rebar joints. This process is typically carried out in a remote server or cloud which has a significantly more processing power. The neural network is already pre-trained to optimise the identification process.

Once an untied rebar joint is identified, the system processor will send a sign to the apparatus 10 to move the tool actuator to the location of the rebar joint, and activate the rebar tying tool 18 to bind the rebar joint. In this scenario, the apparatus 10 is only required to automatic rebar-tying at least 50% or more of the interior joints.

It is understood that those skilled in the art will realise that variations may be made in the core teachings of this invention.

Although the invention has been described with reference to specific examples, it will be appreciated by those skilled in the art that the invention may be embodied in many other forms, in keeping with the broad principles and the spirit of the invention described herein.

The present invention and the described embodiments specifically include the best method known to the applicant of performing the invention. The present invention and the described preferred embodiments specifically include at least one feature that is industrially applicable.

The invention claimed is:

1. An apparatus for reinforcement bar (rebar) joint recognition using artificial intelligence vision comprising:
   a rebar tying tool attached to a micro manipulator; and
   a macro manipulator for moving the position of the micro manipulator;
   wherein the macro manipulator is adapted to move the micro manipulator on a first plane; the micro manipulator is adapted to move the rebar tying tool on a second plane parallel to the first plane and at a first axis vertical to the second plane; and
   wherein the macro manipulator is adapted to move along a scale larger than that of the micro manipulator.

2. The apparatus of claim 1, wherein the macro manipulator comprises a gantry axis servo for moving the micro manipulator along a second axis on the first plane.

3. The apparatus of claim 2, wherein the macro manipulator comprises a carrier axis servo for moving the micro manipulator along a third axis on the first plane, such that the second axis is orthogonal to the third axis.

4. The apparatus of claim 3, wherein the macro manipulator is adapted to move in the scale of metres.

5. The apparatus for reinforcement bar (rebar) joint recognition using artificial intelligence vision comprising:
   a rebar tying tool attached to a micro manipulator; and
   a macro manipulator for moving the position of the micro manipulator;
   wherein the macro manipulator is adapted to move the micro manipulator on a first plane, the micro manipulator is adapted to move the rebar tying tool on a second plane parallel to the first plane and at a first axis vertical to the second plane;
   wherein the micro manipulator includes a longitudinal axis servo for moving the rebar tying tool along a fourth axis on the second plane, and a lateral axis servo for moving the rebar tying tool along a fifth axis on the second plane such that the second axis is orthogonal to the fourth axis.

6. The apparatus of claim 5, wherein the micro manipulator is adapted to move in the scale of millimetres.

7. An apparatus for reinforcement bar (rebar) joint recognition using artificial intelligence vision comprising:
   a rebar tying tool attached to a micro manipulator;
   a macro manipulator for moving the position of the micro manipulator; and
   a system processor connected to one or more controllers for controlling the macro manipulator and micro manipulator, wherein the system processor includes local memory, a storage device, and a communicator;
   wherein the macro manipulator is adapted to move the micro manipulator on a first plane, the micro manipulator is adapted to move the rebar tying tool on a second plane parallel to the first plane and at a first axis vertical to the second plane.

8. The apparatus of claim 7, wherein the system processor is adapted to connect to one or more the controllers through the communicator with wireless signals.

9. The apparatus of claim 7, wherein one controller is adapted to control an activation servo motor for activating the rebar tying tool.

10. The apparatus of claim 7, further comprising one or more sensors, including an image sensor or infrared sensor for capturing images of a workpiece.

11. The apparatus of claim 10, wherein the sensors are disposed on the rebar tying tool.

12. The apparatus of claim 11, wherein the system processor is adapted to send the images to a server.

13. The apparatus of claim 12, wherein the server is adapted to identify a work location on a workpiece by a pattern cognition algorithm.

14. The apparatus of claim 13, wherein the pattern cognition algorithm comprises an artificial intelligence algorithm.

15. The An apparatus of claim 14, wherein the server is adapted to calculate a relative coordinate of the work location.

16. The apparatus of claim 15, wherein the system processor is adapted to move the rebar tying tool to work location according to the relative coordinate.

17. The apparatus of claim 16, wherein the rebar tying tool is adapted to tie the workpiece with wire or welding.

\* \* \* \* \*